United States Patent [19]
Levine

[11] 4,065,219
[45] Dec. 27, 1977

[54] SHAFT ADAPTER

[76] Inventor: Fred Levine, P.O. Box 380876, Miami, Fla. 33138

[21] Appl. No.: 718,039

[22] Filed: Aug. 26, 1976

[51] Int. Cl.² .............................................. F16D 1/00
[52] U.S. Cl. .................................. 403/287; 403/301; 64/15; 416/244 R
[58] Field of Search ..................... 403/3, 4, 287, 301, 403/286, 361; 64/1 C, 1 S, 1 R; 62/295; 416/244 R; 123/41.11, 41.12, 41.4 C

[56] References Cited
U.S. PATENT DOCUMENTS

| 2,032,900 | 3/1936 | Alger | 62/295 |
|---|---|---|---|
| 2,111,642 | 3/1938 | Saier | 403/361 X |
| 2,513,720 | 5/1970 | Allport | 403/2 X |
| 3,024,629 | 3/1962 | Raskhodoff | 403/355 X |
| 3,272,188 | 9/1966 | Sabat | 123/41.46 X |
| 3,386,306 | 6/1968 | Kenyon | 74/548 |
| 3,502,056 | 3/1970 | Dillard | 123/41.12 X |
| 3,824,807 | 7/1974 | Hecht | 123/41.46 X |

*Primary Examiner*—Andrew V. Kundrat
*Attorney, Agent, or Firm*—Clarence A. O'Brien; Harvey B. Jacobson

[57] ABSTRACT

A shaft adapter for a fan motor has an elongated configuration with a fan motor shaft receiving socket portion provided at one end and a fan blade mounting shaft provided at the other end. By making a receptacle formed in the socket portion of a different diameter than the shaft, different diameter motor shafts and fan blade shaft receiving bores can be connected to one another. The adapter is preferably constructed from a rigid yet relatively soft material to facilitate cutting off of the shaft at a desired length for a particular installation.

3 Claims, 5 Drawing Figures

SHAFT ADAPTER

BACKGROUND OF THE INVENTION

1. Field of the Invention

This invention relates generally to a shaft adapter, and particularly to a shaft adapter for converting shaft diameters and varying shaft length in conjunction with fan assemblies employed with refrigeration units, and the like.

2. Description of the Prior Art

A problem arises with the maintenance of refrigeration units and similar systems that employ cooling and air circulating fans. When a motor or blade of such a fan must be replaced, it is generally impractical for a service man to maintain a complete stock of all the different motors and blades that may be encountered. Accordingly, it is not unusual for a service man to carry only a single model replacement motor and associated fans for the commonly encountered capacity fan assemblies. Another situation is encountered where only the motor or blade of a fan assembly need be replaced, and the shaft diameter and/or shaft length of the existing unit is different from the replacement fan motor or fan blade. Thus, it is desirable to have a shaft adapter which will permit the diameter of the shaft to be converted between that of the standard replacement motor and various other shaft diameters. Further, it is desirable to have a shaft diameter which can be readily varied in length to be mated with existing dimensions.

A shaft adapter is known which is made of a relatively hard steel and is attached loosely to a shaft of a fan motor so as to be secured on the motor shaft as by a set screw. This arrangement is undesirable because of the relative inflexibility in use of such an adapter, and because the manner of mounting the adapter on the fan motor shaft is subject to loosening as by vibrations, and the like. In addition, the adapter must be provided with a keyed portion for receiving a likewise keyed fan blade.

SUMMARY OF THE INVENTION

It is an object of the present invention to provide a shaft adapter which facilitates adaptation of a standard diameter motor shaft to another diameter, and also extends the length of the shaft to a user's requirements.

It is another object of the present invention to provide a shaft adapter for fan assemblies used with refrigeration units, and the like, that can be readily cut to proper size so as to eliminate surplus length of the adapter.

These and other objects are achieved according to the present invention by providing a shaft adapter having: an elongated member including a pair of spaced ends, a socket portion forming one of the ends and a shaft portion forming the other of the ends, with the socket portion being arranged for receiving a shaft of a fan motor for rotation with the motor shaft and the shaft portion being arranged for mounting a fan blade thereon for rotation with the member and motor shaft. The socket portion is advantageously provided with a receptacle arranged for receiving the shaft of the fan motor, with the shaft portion being provided with a longitudinally extending shaft. While the elongated member forming the adapter can be constructed from a substantially rigid yet relatively soft material, such as polyethylene or nylon, if desired the member can be constructed from a metal such as aluminum with the receptacle of the socket portion having disposed therein an insert constructed from a suitable polymeric resin, and the like, for receiving the shaft of the fan motor.

The receptacle provided in the socket portion and the shaft of the shaft portion can each have a diameter different from the diameter of the other, although it will be appreciated that if the adapter is used merely to extend the length of the shaft of the associated fan motor, the diameters of the receptacle and adapter shaft can be equal. By constructing the shaft adapter from a material having a low shear strength, severing of undesired lengths of the longitudinal shaft of the shaft portion of the adapter is greatly facilitated.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
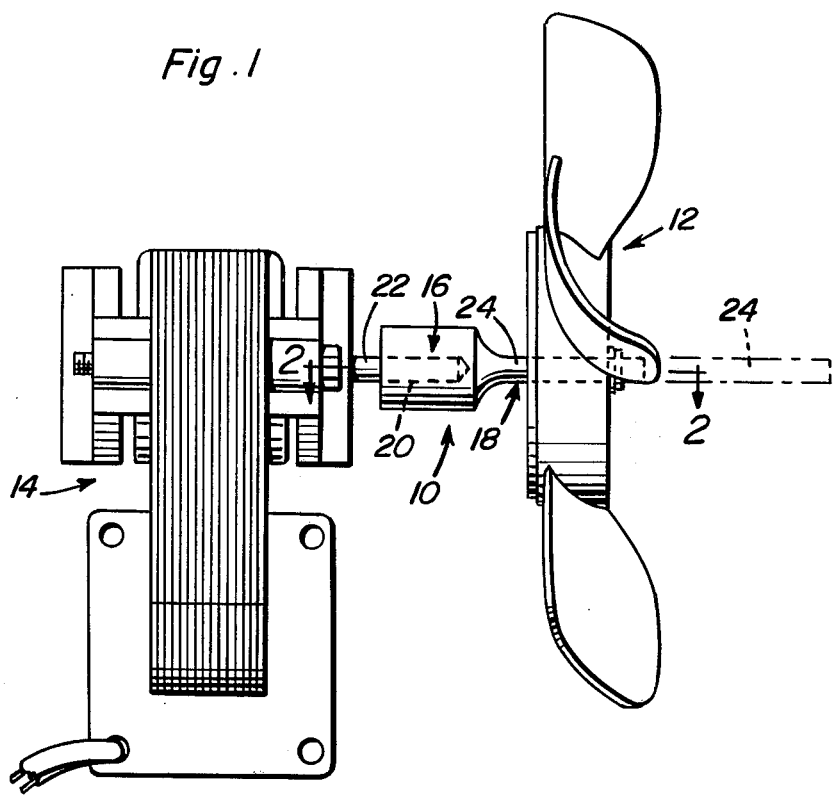
FIG. 1 is a side elevational view showing a shaft adapter according to the present invention in conjunction with the motor and blade of a fan assembly.
Figure 2:
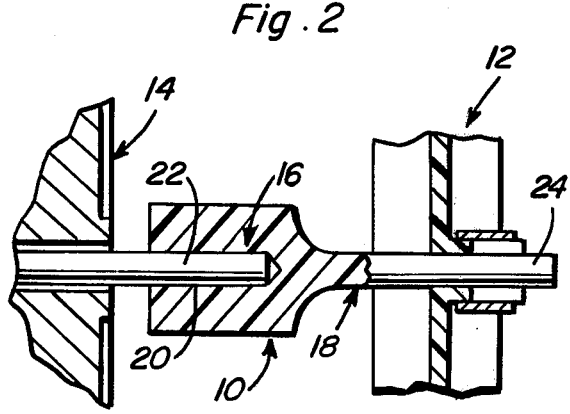
FIG. 2 is an enlarged, fragmentary, sectional view taken generally along the line 2—2 of FIG. 1.
Figure 3:
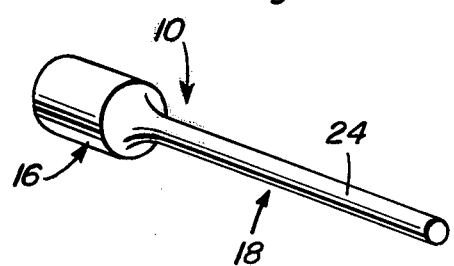
FIG. 3 is a perspective view showing the shaft adapter of FIGS. 1 and 2 before a surplus length of the shaft of the adapter has been removed.

Referring now more particularly to FIGS. 1 through 3 of the drawing, a shaft adapter 10 is shown as mounting a conventional fan blade 12 on a conventional fan motor 14. This adapter 10 includes an elongated member having a pair of spaced ends, with a socket portion 16 being formed at one of the ends and a shaft portion 18 formed at the other of the ends. Socket portion 16 is arranged for receiving the shaft of motor 14, and shaft portion 18 is arranged for mounting fan blade 12 for rotation with the adapter 10.

Socket portion 16 is provided with a receptacle 20 arranged for receiving the shaft 22 of fan motor 14. Shaft portion 18 is formed by a longitudinally extending shaft 24 connected to the hub or socket portion 16 as by the illustrated radius.

According to an advantageous feature of the present invention, and to permit adapter 10 to be employed for converting shaft diameters between shaft 22 of motor 14 and the mounting bore provided in the hub of fan blade 12, receptacle 20 and shaft 24 have diameters different from one another. Nevertheless, when only the length of shaft 22 is being varied by use of an adapter 10, the diamters of receptacle 20 and shaft 24 may be equal. Adapter 10 is intended to be constructed from a suitable synthetic material, such as as a polymeric resin including polyethylene and nylon. In this manner, receptacle 20 and shaft 24 can be sized appropriately with respect to shaft 22 and the bore of blade 12 to provide for forced fits between the adapter 10 and the blade 12 and shaft 22. Further, such materials have shear strengths such that severing of undesired lengths of the shaft 24 can be readily facilitated. The broken lines in FIG. 1 show a portion of shaft 24 to be removed. If the adapter 10 is too long, a user of the invention can place his fan blade 12 where requirements dictate it be, and the surplus length of shaft 24 can be cut easily with wire cutters (not shown) and similar cutting tools.

Figure 4:
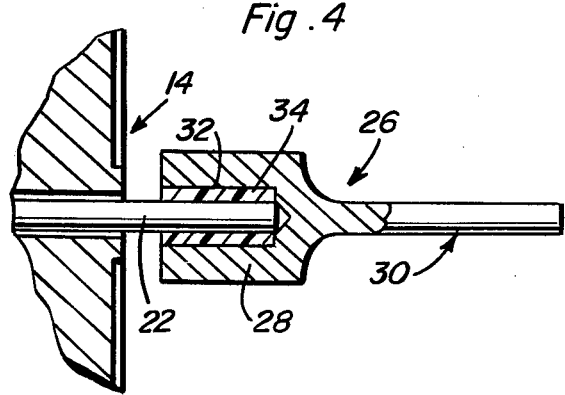
FIG. 4 is a fragmentary, sectional view similar to FIG. 2, but showing a second embodiment of the invention.
Figure 5:
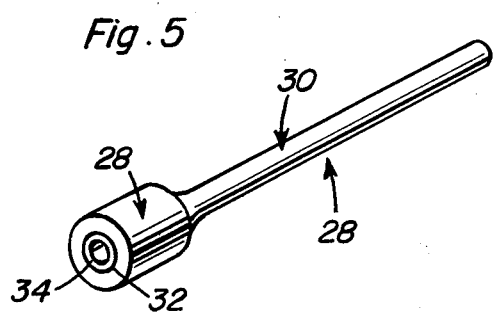
FIG. 5 is a perspective view showing the shaft adapter of FIG. 4 before the surplus length of the shaft of the adapter has been removed.

FIGS. 4 and 5 of the drawing show a second embodiment of the invention wherein a shaft adapter 26 is provided with a socket portion 28 and a shaft portion 30 similar in configuration to the portions of adapter 10. In this instance, however, the adapter 26 can be constructed from a suitable metal, such as aluminum, and the receptacle 32 provided in the socket portion 28 made of such a size as to receive a generally cylindrical hollow insert 34 constructed from a suitable polymeric resin which will achieve the desired force fit between socket portion 28 and shaft 22 of motor 14. By this arrangement, more rigid material, such as solid metals, can be used to construct the adapter while retaining the advantage of achieving a force fit between shaft 22 and the socket portion 28. The use of a relatively soft metal, such as aluminum, to construct an adapter 26 still permits a force fit between fan blade 12 and the shaft portion 30 of the adapter, as well as retaining the relative ease of severing undesired lengths of shaft portion 30 from the adapter 26.

As can be appreciated from the above description and from the drawing, shaft adapters according to the invention permit one to stock fan motors having shafts of one of any number of standard diameters and convert the shaft to any one of a number of different diamters and lengths. For example, one can adapt from a 0.187 inch diameter motor shaft to 0.125 inches, 0.181 inches, and even 0.187 inches. This flexibility will permit standard replacement fan motors and blades to be employed in a great range of refrigeration units, and the like, so as to minimize the number of replacement parts a service man must keep at hand.

The socket end of the adapter also will fit over a threaded shaft (not shown) such as found on condenser fan motors. Further, the shaft end, or portion, can be made with molded threads (not shown) for use of the adapter either as an extender or as means of conversion to a particular thread. This threaded adapter can be cut off easily by first threading a metal nut on to the shaft portion, cutting the shaft portion to length, and then removing the metal nut to clear the threads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a fan motor having a shaft and with a fan blade, a shaft adapter for mounting the fan blade on the shaft of the fan motor, the shaft adapter comprising an elongated member having a pair of spaced ends, a socket portion forming one of the ends and a shaft portion forming the other of the ends, with the socket portion being arranged for receiving a shaft of a fan motor for rotation with the shaft, and the shaft portion being arranged for mounting a fan blade for rotation with the member, the socket portion being provided with a receptacle arranged for receiving the shaft of the fan motor, and wherein the shaft portion includes a longitudinally extending shaft, there being a plurality of adapters forming a set, each of the adapters having a receptacle of a diameter equal to the diameter of the receptacle of the other adapters, and a shaft having a diameter different from the diameters of each of the other adapters.

2. An article as defined in claim 1, wherein the socket portion of each of the adapters includes a hollow insert fit in the receptacle, the shaft of the fan motor being received in the insert by a force fit.

3. An article as defined in claim 1, wherein the elongated member of each of the adapters is constructed from a relatively soft material having a low shear strength for permitting force fits of the member with the shaft of the fan motor and with the fan blade and for facilitating severing of undesired lengths of the longitudinally extending shaft of the shaft portion.

* * * * *